(12) United States Patent
Garrett

(10) Patent No.: US 8,016,334 B2
(45) Date of Patent: Sep. 13, 2011

(54) BALE LIFTING DEVICE FOR THE HANDLING OF BALES OF FIBROUS MATERIAL

(76) Inventor: Joe Garrett, Carmen, ID (US)

( * ) Notice: Subject to any disclaimer, the term of this patent is extended or adjusted under 35 U.S.C. 154(b) by 0 days.

(21) Appl. No.: 12/418,672

(22) Filed: Apr. 6, 2009

(65) Prior Publication Data
US 2009/0191027 A1 Jul. 30, 2009

Related U.S. Application Data

(63) Continuation of application No. 11/530,803, filed on Sep. 11, 2006, now abandoned.

(51) Int. Cl.
*B66F 9/14* (2006.01)
*A01D 90/12* (2006.01)

(52) U.S. Cl. ...... 294/119.1; 294/88; 414/24.5; 414/621; 414/721

(58) Field of Classification Search ............. 294/119.1, 294/88, 120; 414/667, 671, 721, 621, 24.5
See application file for complete search history.

(56) References Cited

U.S. PATENT DOCUMENTS

| | | | | |
|---|---|---|---|---|
| 2,647,650 A * | 8/1953 | Sherriff | | 414/620 |
| 3,092,274 A * | 6/1963 | Harris | | 414/607 |
| 3,180,514 A * | 4/1965 | Horton | | 414/620 |
| 3,245,562 A * | 4/1966 | Horton | | 414/621 |
| 3,424,328 A * | 1/1969 | Sandrock et al. | | 414/705 |
| 3,450,288 A * | 6/1969 | Walsh | | 414/667 |
| 3,643,827 A * | 2/1972 | Link | | 414/621 |
| 3,971,584 A | 7/1976 | Duncan | | |
| 3,971,585 A * | 7/1976 | LaBudde | | 294/88 |
| 4,032,184 A | 6/1977 | Blair | | |
| 4,175,903 A * | 11/1979 | Carson | | 414/408 |
| 4,217,075 A | 8/1980 | Frank | | |
| 4,360,302 A | 11/1982 | Askov et al. | | |
| 4,459,075 A | 7/1984 | Eichenberger | | |
| 4,556,359 A | 12/1985 | Sinclair | | |
| 4,936,737 A | 6/1990 | Rae et al. | | |
| 5,055,091 A | 10/1991 | Morris, Jr. et al. | | |
| 5,082,413 A | 1/1992 | Grosz et al. | | |
| 5,340,259 A | 8/1994 | Flaskey | | |
| 5,542,803 A | 8/1996 | Driggs | | |
| 5,584,637 A | 12/1996 | Jensen, Sr. | | |
| 5,807,061 A | 9/1998 | Donoghue et al. | | |
| 5,895,199 A | 4/1999 | Baumert, III et al. | | |
| 6,312,205 B1 | 11/2001 | Vandenberg | | |
| 6,969,225 B2* | 11/2005 | Mensch | | 414/685 |
| 2005/0220571 A1 | 10/2005 | Ackerman et al. | | |
| 2010/0260590 A1 | 10/2010 | Ford | | |

* cited by examiner

*Primary Examiner* — Dean Kramer
(74) *Attorney, Agent, or Firm* — Buchanan Nipper

(57) ABSTRACT

A bale lifting device for the lifting, moving, and handling of cargo and/or bales of fibrous material such as hay. The bale lifting device having a pair of generally facing hydraulic cylinders configured for moving a pair of forks from a close inner position to a spaced apart outer position.

13 Claims, 4 Drawing Sheets

BALE LIFTING DEVICE FOR THE HANDLING OF BALES OF FIBROUS MATERIAL

PRIORITY/CROSS-REFERENCE TO RELATED APPLICATIONS

This application is a continuation application of application Ser. No. 11/530,803, filed Sep. 11, 2006, entitled BALE LIFTING DEVICE FOR THE HANDLING OF BALES OF FIBROUS MATERIAL, which is pending, and incorporated herein by this reference.

FIELD OF THE INVENTION

The present invention generally relates to agricultural machinery, and more particularly to devices configured for lifting and moving of cargo and/or bales of fibrous material such as hay.

BACKGROUND OF THE INVENTION

For the purposes of this disclosure, the term "hay" will be used in a generic sense to describe cut foliage, particularly hay, such as that made from alfalfa, grasses and straw. While this invention is ideally used to handle "hay bales," said generic term is intended to include any large item, including but not limited to "cargo" in general, bales of cotton, bales of cardboard, etc.

In the United States, the baling of hay is typically done in a number of differed sizes, formats and orientations. There are two standard "field bale" sizes: 18"×36-48"×14" or 16"×18"-(46-52) (often referred to as a "2-string bale") and 24"×46-48"×15-16" (often referred to as a "3-string bale"). Other types of hay bales that are common within agriculture include large round bales, 3'×3' "mid-size" bales, 3'×4' "mid-size" bales, and 4'×4' "ton-sized" bales. While these are the most common types/sizes of hay bales, other hay bale sizes do and/or may exist in the future.

Various types of devices are known which are utilized for picking up and handling bales of hay. However, what is needed is a device that can reliably handle both larger sized bales as well as the smaller field sized bales. Embodiments of the present invention solve this need.

SUMMARY OF THE INVENTION

One embodiment of the present invention is a bale lifting device for the handling of bales of fibrous material. This bale lifting device comprising a frame, a first carriage, a second carriage, a first hydraulic cylinder, a second hydraulic cylinder, and a hydraulic control system.

The frame is configured for pivotable attachment to a farm implement at a farm implement arm via a farm implement attachment portion. The farm implement having an articulated arm configured for moving in an arc. The farm implement attachment portion pivotally connected to the farm implement arm so that as the farm implement lifts the bale lifting device, the bale lifting device can be tilted relative to the farm implement arm so that the bale lifting device's forks (described infra) can be returned to a generally horizontal position. The frame further comprising a pair of generally parallel rails having centers, first ends, and second ends. A first end plate attaches to the first ends, and a second end plate attaches to the second ends, thereby generally defining the frame.

The first carriage is configured for slideable attachment on at least one, preferably both, of the first and second rails. The first carriage having a first fork extending therefrom oriented generally perpendicular to the orientation of the generally parallel rails. The first fork comprising at least one generally perpendicular first flange configured for assisting in the lifting of the bales.

The second carriage is configured for slideable attachment on at least one, preferably both, of the first and second rails. The second carriage having a second fork extending therefrom generally perpendicular from said rails. The second fork comprising at least one generally perpendicular second flange configured for assisting in lifting of the bales.

This embodiment of the present invention also having a hydraulic control system that controls the operation of a pair of hydraulic cylinders. The first hydraulic cylinder is configured for moving the first carriage from a first position near the first rail ends to a third position near the rail centers. The second hydraulic cylinder is configured for moving the second carriage from a second position near the rail second ends to a fourth position near the rail centers.

The hydraulic control system is configured for simultaneously moving the first and second carriages from the first and second respective positions to their third and forth respective positions and vice versa, thereby allowing the bale lifting device to close upon and grasp bales (or partial bales), and/or open up and release bales.

The ability to move into the center (third/fourth) position allows the bale lifting device to grasp and pick up cargo as small as single standard hay bales and/or portions of hay bales. The ability to move into the outside (first/second) position allows the bale lifting device to widen to grasp and pick up large items such as cargo (including stacks of standard hay bales, round bales, 3'×3' mid-sized bales, 3'×4' mid-sized bales, and 4'×4' ton-sized bales). Such is a summary of one embodiment of the present invention.

DESCRIPTION OF THE PREFERRED EMBODIMENTS

Figure 1:
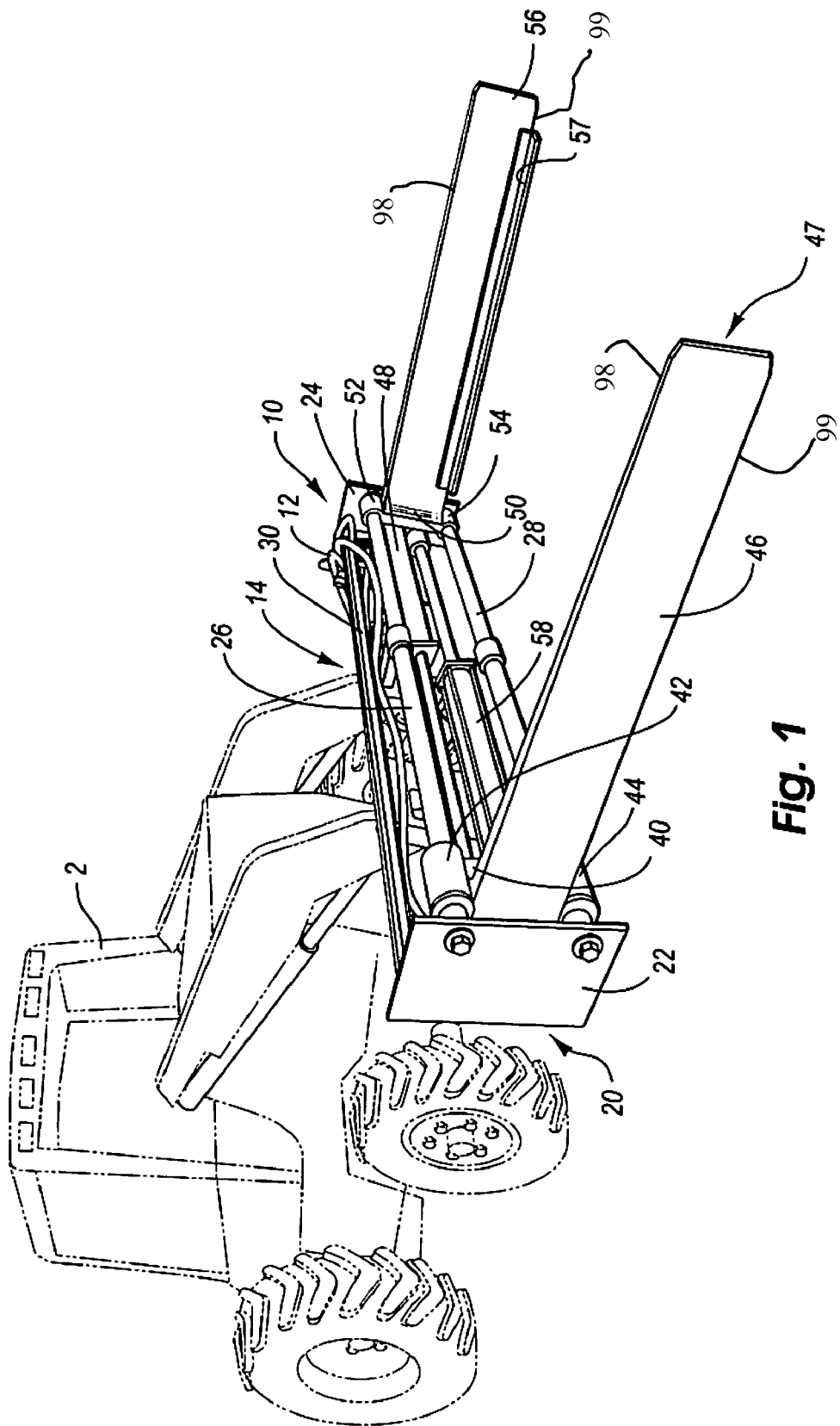
FIG. 1 shows an environmental, perspective view of one embodiment of the present invention attached to a piece of farm machinery.

In the following description and in the Figures, like elements are identified with like reference numerals. The use of "or" indicates a non-exclusive alternative without limitation unless otherwise noted. The use of "including" means "including, but not limited to," unless otherwise noted.

Generally, the present invention is an apparatus for handling various sizes of bales and/or stacks of bales of fibrous materials such as hay. Such an apparatus/device particularly of use to farmers, ranchers, and/or dairyman. For instance, a rancher may utilize both standard field-sized hay bales and larger "ton-sized" bales on his/her farm. Obviously, it would be quite advantageous to have one's farm equipment configured for handling bales of fibrous material regardless of their size.

The present invention, in its preferred configuration, can handle widths anywhere from partial "field" bales of hay up to and including 4'×4' "ton-sized" bales of hay. "Handle" including picking up baled hay from the field; loading and unloading bales upon hay transportation equipment; and stacking hay inside a building up to the buildings ceiling. "Handle" also including clamping on a hay bale(s), a big bale, and/or spearing a big bale with a first fork and using the second fork to clamp the big bale.

Referring initially to FIG. 1, shown is one embodiment of the present invention. The Figure showing a piece of farm machinery 2 (such as a front end loader, tractor, etc.) having the invented bale lifting (hay handling) device 10 attached thereto. The device 10 having a farm implement attachment portion (not shown) that is utilized to connect the frame 20 of the bale lifting device 10 to the machinery 2 in the standard manner in which attachments are attached to such machinery traditionally.

In the embodiment shown in these Figures, the frame 20 has a first end plate 22 and a second end plate 24. The end plates 22, 24 comprising generally rectangular pieces of steel (or other material) which are oriented in planes generally parallel to one another. While this is preferred, obviously non-parallel or other arrangements, shapes or types of material could likewise be used. The first end plate 22 on left side 80 of the frame 20, the second end plate 24 on the right side 82 of the frame 20.

The frame 20 also comprising an upper rail 26 and a lower rail 28. These rails having first ends which are configured for attaching to the first end plate 22 and second ends which are configured for attaching the second end plate 24. For instance, in the embodiment shown, the first ends of the upper rail 26 and the lower rail 28 attach to the first end plate 22 through use of a pair of bolts (as shown in the figure). Likewise, the second ends of the upper rail 26 and the lower rail 28 attach to the second end plates 24 through use of a pair of bolts (not shown). Other methods of attachment could comprise: pins, locks, welds, friction fits, etc.

These rails 26, 28 also having center portions. It is preferred that the rails comprise lengths of steel or other tubing. The rails can be single, or multiple pieces joined together. The rails are preferably round tubing, but other shapes, for instance square tubing, could likewise be utilized.

Figure 4:
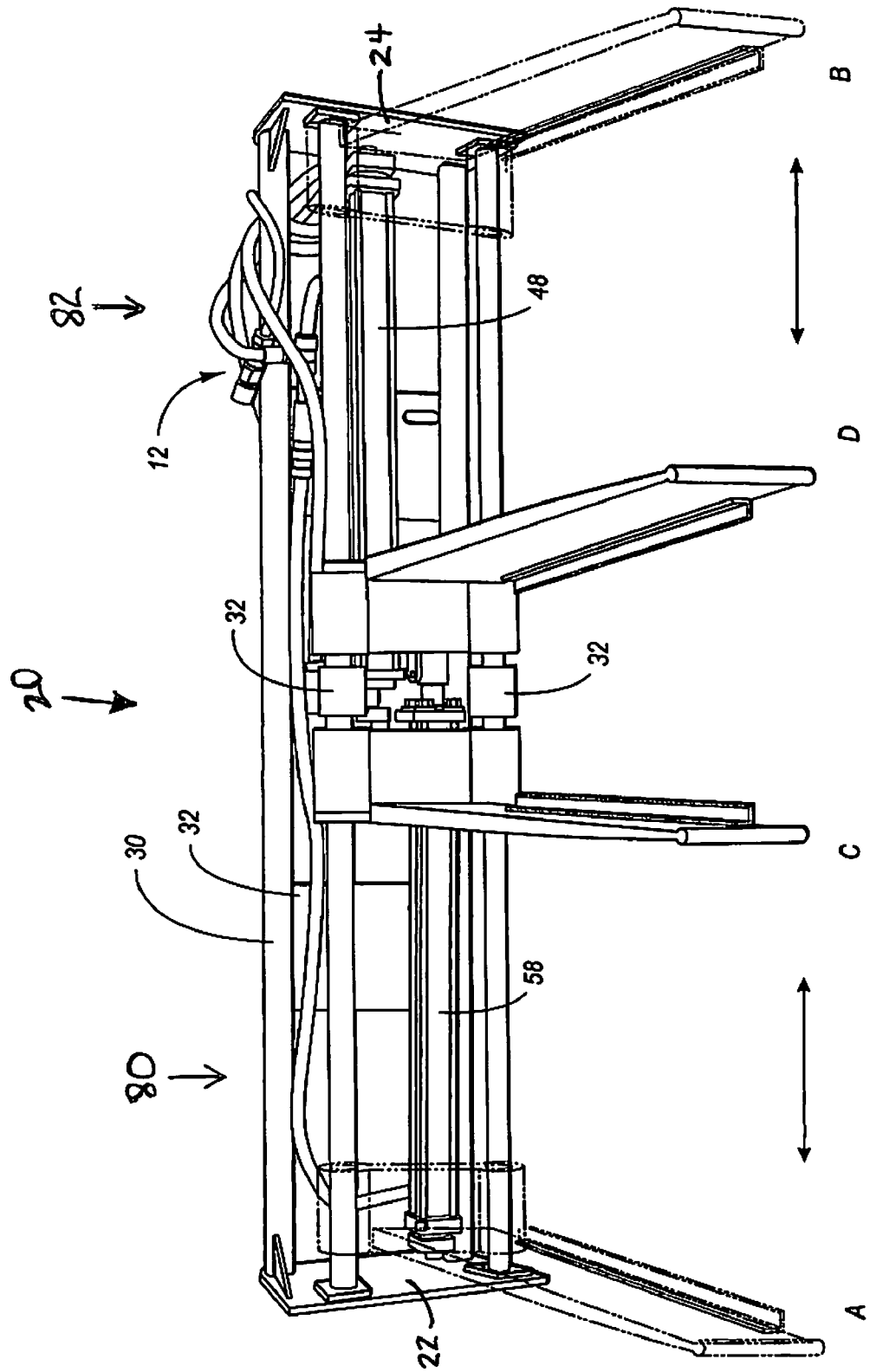
FIG. 4 shows a front, perspective view of the embodiment of FIG. 1 showing the devices ability to move from its first and second positions to its third and fourth positions.

In the embodiment shown, particularly as can be seen in FIG. 4, the rails attaching to and/or extending through a pair of support connections 32 which provide center support for center portions of the upper and lower rails thereby keeping them aligned generally parallel to one another and generally horizontally related to the ground surface. The frame 20 may further comprise support rods 30 and or other support connections 32 or structure providing the necessary support for the frame and/or frame components.

The bale lifting device 10 further comprising a first carriage 40 and a second carriage 50. These carriages being configured for attachment to at least one of, preferably both of, the rails 26, 28. In the embodiment shown in the Figures, the first and second carriages (40, 50) respectively comprising upper rail guides 42, 52 and lower rail guides 44, 54. The upper rail 26 configured for extending through the upper rail guides 42, 52 and the lower rail 28 configured for extending through the lower rail guides 44, 54. This being done before the rails are attached to the end plates. It is further preferred that the rail guides be lined with wearable bushings or bearings that can be replaced by removing one or both of the end plates or bolts and thereby accessing the carriages. While this is the preferred structure, obviously other types of structure for attaching the carriages to the rails are likewise envisioned.

While it is preferred that both of the carriages (40, 50) slidably engage both the upper rail 26 and the lower rail 28, it is possible that only one of these rails could be utilized. For instance, the carriages could be mounted for slideable engagement solely upon the upper rail 26.

Extending from the first carriage 40, generally perpendicular to the orientation of the upper and/or lower rails (26, 28), is a first fork 46. Likewise, extending from the second carriage 50, generally perpendicular to the orientation of the upper and/or lower rails, is a second fork 56. These two forks configured for slidably moving towards or away from one another through use of the hydraulic control system. The forks are configured to clamp the sides of the hay bales and/or the ends of the hay bales.

In a different embodiment, the forks could have a top and bottom rail held together like a truss. It is preferred that the height of the device and/or the forks be limited to be no greater than the height of a single "field" bale, thereby allowing the device to be used to stack hay in a building clear to the ceiling without the device contacting the ceiling of the structure as hay is stacked.

Figure 3:
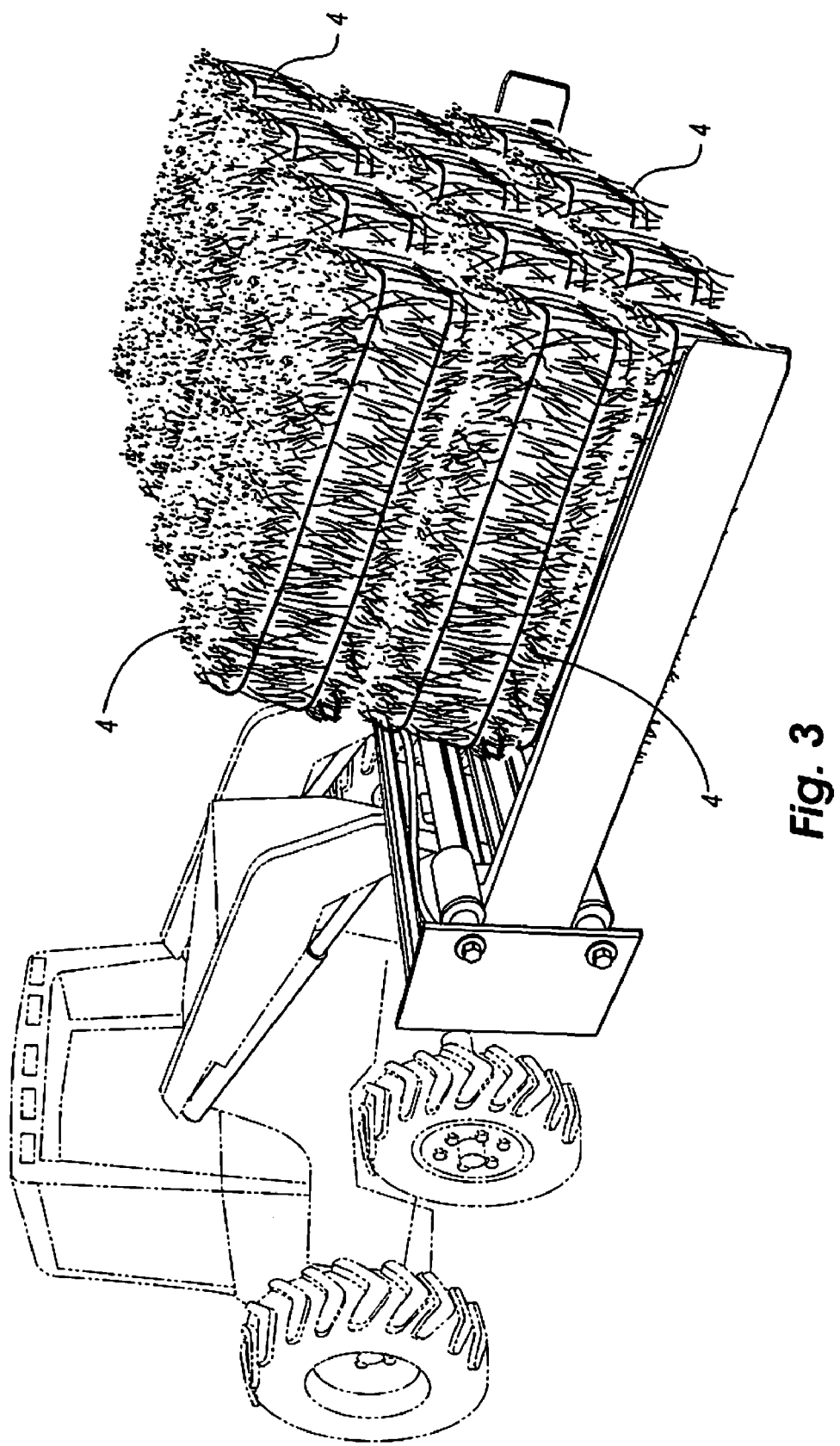
FIG. 3 shows an environmental, perspective view of the embodiment of FIG. 1 showing the carriages spread further apart so that a stack of field sized hay bales can be lifted.

However the forks could be taller than what is shown in the drawings, thereby allowing two (or more) layers of hay to be physically clamped by the forks (and not just supported by clamped bales as is shown in FIG. 3). The use of such configured forks would stabilize the lifting of stacks of hay.

The first and second forks (46, 56) having an upper surface 98 and a lower surface 99 defining a fork vertical height there-between. It is preferred that a pair of flanges 47, 57 extend from the inner side (towards the center of the rails) of the first and second forks (46, 56). These flanges configured for assisting in the grasping of a hay bale(s) held between the first and second forks. While the preferred embodiment shows the use of lateral flanges extending from adjacent to lower surface 99 of the first and second forks, other structure extending therefrom is likewise envisioned, including, but not limited to, the utilization of bumps, nodes, nodules, pins, forks or other protuberances.

Specifically referring to FIG. 4 now, connecting (in the standard manner) to the backside (not shown) of the first carriage is the first hydraulic cylinder 48 permitting the first carriage 40 to be moved from the "first" position (A) adjacent the first end plate 22 back toward the center of the upper and lower rails to the "third" position (C). Likewise, a second hydraulic cylinder 58 is configured for attachment to the backside (not shown) of the second carriage 50 (in the standard manner) so that the second carriage 50 can be moved from a "second" position (B) where the second carriage 50 is adjacent the second end plate 24 to the general center of the upper and lower rails (26, 28) to the "fourth" position (D).

It is preferred that a hydraulic control system 12 be utilized for controlling operation of the first and second hydraulic cylinders (or other actuators). It is preferred that the hydraulic cylinders be configured for simultaneously moving the first and second carriages from their first (A) and second (B) positions to their third (C) and fourth (D) positions and vice versa. However, the hydraulic control system could operate the carriages independently and/or individually.

A typical hydraulic control system comprising a hydraulic fluid reservoir fluidly connected to at least one pump. The pump(s) being fluidly connected with a control valve(s) which in turn control the supply of hydraulic fluid to one or more hydraulic cylinders.

In the preferred embodiment, the hydraulic cylinders 48, 58 are attached to the carriage on one side and the frame and/or end plate on the opposite side of the bale lifting device. This configuration allows the forks to open as far as possible but also come together and close to a size (in the preferred embodiment) less than the width of a 2-string bale.

Figure 2:
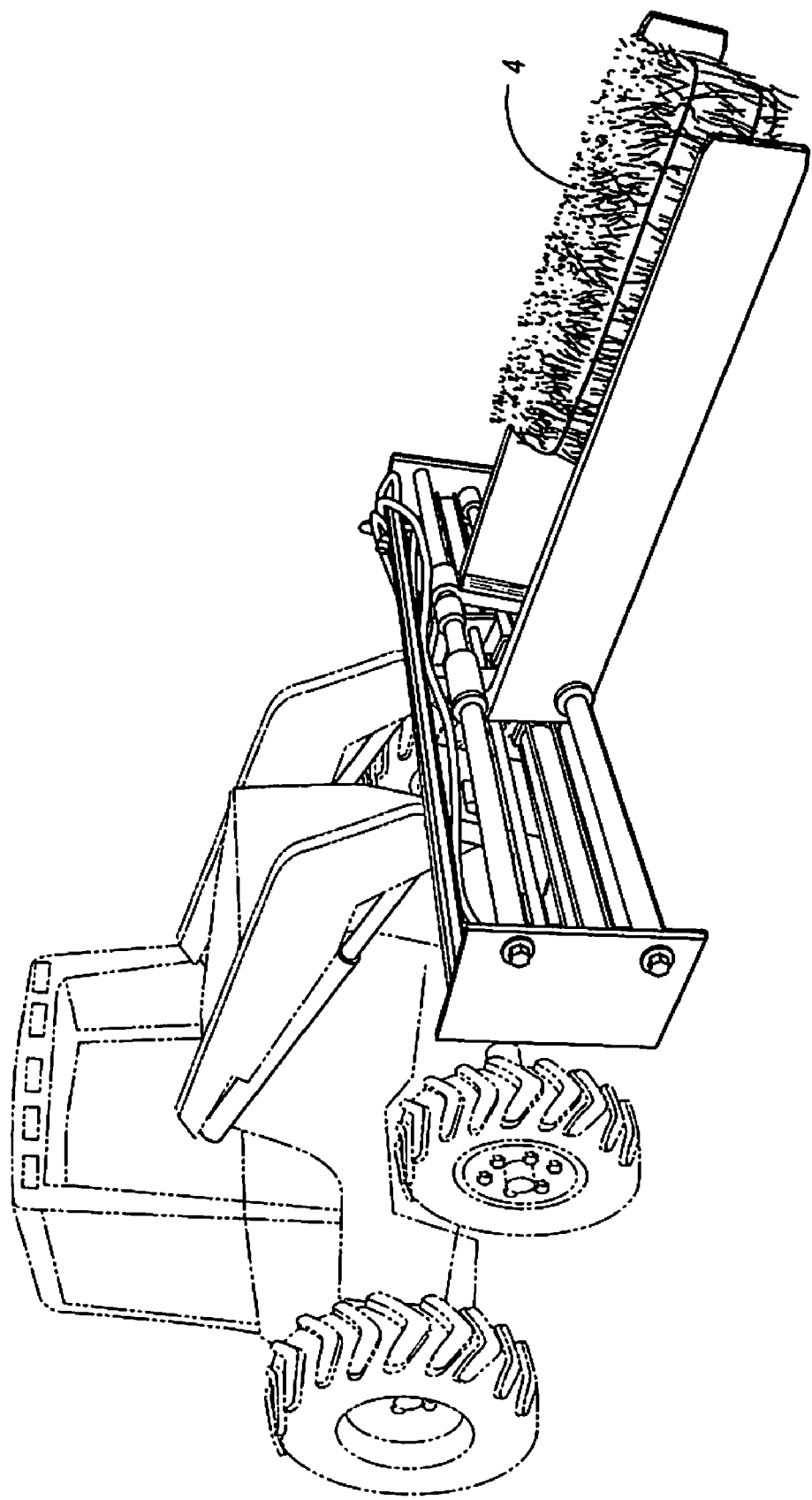
FIG. 2 shows an environmental, perspective view of the embodiment of FIG. 1 shown with the carriages maneuvered together so as to lift a single field sized bale of hay.

Referring now to FIG. 2, shown is the retraction of the first and second hydraulic cylinders thereby drawing the first and second forks towards their third (C) and fourth (D) positions (as shown in FIG. 4) near the center of the upper and lower rails thereby enabling the bale lifting device to grasp and hold therein, a single standard field sized bale (FIG. 2). Whereas, FIG. 3 shows the first and second forks generally towards their first (A) and second (B) positions (as shown in FIG. 4) clamping together a small haystack composing of four standard field sized bales oriented next to one other, width to four rows stacked thereupon. The multiples that may be clamped are dependent upon the designed width of the implement, i.e. one-to-three bales, one-to-four bales, one-to-five bales, etc.

Referring now to FIG. 4, the hydraulic cylinders shown retracted, bringing the first fork 46 and second fork 56 to their respective third (C) and fourth (D) positions. Arrows within FIG. 4 show how the first and second carriages (40, 50) can be moved (via the hydraulic cylinders (48, 58)) back to their outer positions, respectively the first position (A) and the second position (B).

Example Embodiment. One example embodiment of the present invention being a bale lifting device for the handling of bales of fibrous material. The bale lifting device comprising a frame, a pair of carriages, a pair of hydraulic cylinders and a hydraulic control system.

The frame being configured for attachment to a farm implement via a farm implement attachment portion. The frame comprising: (a) at least one rail having a center, a first end and a second end, (b) a first end plate attaching to the first end, and (c) a second end plate attaching to the second end.

The carriages comprising a first carriage and a second carriage. The first carriage configured for slideable attachment on the first rail. The first carriage having a first fork extending there-from generally perpendicular to the rail. The second carriage configured for slideable attachment on the first rail. The second carriage having a second fork extending there-from generally perpendicular to the rail.

The hydraulic cylinders comprising a first hydraulic cylinder and a second hydraulic cylinder. The first hydraulic cylinder configured for moving the first carriage from a first position near the rail first end to a third position near the rail center. The second hydraulic cylinder configured for moving the second carriage from a second position near the rail second end to a fourth position near the rail center. The hydraulic control system for controlling the operation of the first and second hydraulic cylinders. The hydraulic control system configured for simultaneously moving the first and second carriages from their first and second respective positions to their third and fourth respective positions and vice versa.

While the invention is susceptible of various modifications and alternative constructions, certain illustrated embodiments thereof have been shown in the drawings and will be described below in detail. It should be understood, however, that there is no intention to limit the invention to the specific form disclosed, but, on the contrary, the invention is to cover all modifications, alternative constructions, and equivalents falling within the spirit and scope of the invention as defined in the claims.

The exemplary embodiments shown in the figures and described above illustrate but do not limit the invention. It should be understood that there is no intention to limit the invention to the specific form disclosed; rather, the invention is to cover all modifications, alternative constructions, and equivalents falling within the spirit and scope of the invention as defined in the claims. For example, while the exemplary embodiments illustrate hay handling equipment, the invention is not limited to use with hay and/or hay handling equipment and may be used with other equipment and/or cargo/fibrous materials. While the invention is not limited to use with hay handling equipment, it is expected that various embodiments of the invention will be particularly useful in such devices. Hence, the foregoing description should not be construed to limit the scope of the invention, which is defined in the following claims.

While there is shown and described the present preferred embodiment of the invention, it is to be distinctly understood that this invention is not limited thereto, but may be variously embodied to practice within the scope of the following claims. From the foregoing description, it will be apparent that various changes may be made without departing from the spirit and scope of the invention as defined by the following claims.

What is claimed is:

1. A bale lifting device for attachment to a farm implement having an articulated arm configured for moving in an arc, said bale lifting device for the handling of bales of fibrous material, said bale lifting device comprising:

a frame configured for pivotable attachment to said farm implement arm via a farm implement attachment portion, said frame comprising a first rail having a center, a first end and a second end, a second rail having a center, a first end and a second end, a first end plate attaching to said first ends, and a second end plate attaching to said second ends;

a first carriage configured for slideable attachment on said first and said second rails, said first carriage having a first fork extending there-from generally perpendicular to said first and second rails, said first fork having a fork vertical height, said fork vertical height fixed generally perpendicular to said first and second rails, wherein said first fork comprises at least one generally perpendicular flange extending towards a second fork;

a second carriage configured for slideable attachment on said first and second rails, said second carriage having said second fork extending there-from generally perpendicular to said first and second rails, said second fork having a fork vertical height, said second fork vertical height fixed generally perpendicular to said first and second rails, wherein said second fork comprises at least one generally perpendicular flange extending towards said first fork;

a first hydraulic cylinder configured for moving said first carriage from a first position near said first and second rail first ends to a third position near said first and second rail centers;

a second hydraulic cylinder configured for moving said second carriage from a second position near said first and second rail second ends to a fourth position near said first and second rail centers; and a hydraulic control system for controlling the operation of said first and second hydraulic cylinders, said hydraulic control system configured for simultaneously moving the first and second carriages from their first and second respective positions to their third and fourth respective positions and vice versa;

wherein said farm implement attachment portion is pivotally connected to said farm implement arm so that as farm implement lifts said bale lifting device, said bale lifting device can be tilted relative to said farm implement arm so that said forks can be returned to a generally horizontal position.

2. The bale lifting device of claim 1, wherein said first and second forks have lower surfaces and inner sides, wherein said perpendicular flanges extend from said inner sides of said first and second forks, and wherein said perpendicular flanges are adjacent said lower surfaces of said first and second forks.

3. The bale lifting device of claim 1, wherein said first and second rails are attached to said first and second end plates so that said first and second rails are generally parallel to one another.

4. The bale lifting device of claim 1, wherein said ability to move into the third and fourth positions allows said bale lifting device to grasp and pick up cargo as small as portions of said bales.

5. The bale lifting device of claim 1, wherein said ability to move into the first and second positions allows the bale lifting device to grasp and pick up items as large as cargo selected from the group consisting of: a stack of standard hay bales, round bales, 3'×3' mid-size bales, 3'×4' mid-size bales and '4×4' "ton-sized" bales.

6. The bale lifting device of claim 1, wherein said first and second forks have lower surfaces and inner sides, wherein said perpendicular flanges extend from said inner sides of said first and second forks, wherein said perpendicular flanges are adjacent said lower surfaces of said first and second forks, and wherein said first and second rails are attached to said first and second end plates so that said first and second rails are generally parallel to one another.

7. The bale lifting device of claim 6, wherein said ability to move into the third and fourth positions allows said bale lifting device to grasp and pick up cargo as small as portions of said bales.

8. The bale lifting device of claim 6, wherein said ability to move into the first and second positions allows the bale lifting device to grasp and pick up items as large as cargo selected from the group consisting of: a stack of standard hay bales, round bales, 3'×3' mid-size bales, 3'×4' mid-size bales and '4×4' "ton-sized" bales.

9. A bale lifting device for attachment to a farm implement having an articulated arm configured for moving in an arc, said bale lifting device for the handling of bales of fibrous material, said bale lifting device comprising:
   a frame configured for pivotable attachment to said farm implement arm via a farm implement attachment portion, said frame comprising a first rail having a center and a second rail having a center, first ends and second ends, a first end plate attaching to said first ends and a second end plate attaching to said second ends;
   a first carriage configured for slideable attachment on said first and second rails, said first carriage having a first fork extending there-from generally perpendicular to said rails, said first fork having a fork vertical height, said fork vertical height fixed generally perpendicular to said first rail;
   a second carriage configured for slideable attachment on said first and second rails, said second carriage having a second fork extending there-from generally perpendicular to said rails, said second fork having a fork vertical height, said second fork vertical height fixed generally perpendicular to said second rail;
   a first hydraulic cylinder configured for moving said first carriage from a first position near said rail first ends to a third position near said rail centers;
   a second hydraulic cylinder configured for moving said second carriage from a second position near said rail second ends to a fourth position near said rail centers; and
   a hydraulic control system for controlling the operation of said first and second hydraulic cylinders, said hydraulic control system configured for simultaneously moving the first and second carriages from their first and second respective positions to their third and fourth respective positions and vice versa
   wherein said farm implement attachment portion is pivotally connected to said farm implement arm so that as farm implement lifts said bale lifting device, said bale lifting device can be tilted relative to said farm implement arm so that said forks can be returned to a generally horizontal position.

10. The bale lifting device of claim 9, wherein each of said forks comprise at least one generally perpendicular flange configured for assisting in the lifting of said bales.

11. The bale lifting device of claim 9, wherein said ability to move into the third and fourth positions allows said bale lifting device to grasp and pick up cargo as small as portions of said bales.

12. The bale lifting device of claim 9, wherein said ability to move into the first and second positions allows the bale lifting device to grasp and pick up items as large as cargo selected from the group consisting of: a stack of standard hay bales, round bales, 3'×3' mid-size bales, 3'×4' mid-size bales and '4×4' "ton-sized" bales.

13. A bale lifting device for the handling of bales of fibrous material, said bale lifting device comprising:
   a farm implement having an articulated arm configured for moving in an arc;
   a frame configured for pivotable attachment to said farm implement arm via a farm implement attachment portion, said frame comprising a first rail having a center, a first end and a second end, a second rail having a center, a first end and a second end, a first end plate attaching to said first ends, and a second end plate attaching to said second ends;
   a first carriage configured for slideable attachment on said first and said second rails, said first carriage having a first fork extending there-from generally perpendicular to said first and second rails, said first fork having a fork vertical height, said fork vertical height fixed generally perpendicular to said first and second rails, wherein said first fork comprises at least one generally perpendicular flange extending towards a second fork;
   a second carriage configured for slideable attachment on said first and second rails, said second carriage having said second fork extending there-from generally perpendicular to said first and second rails, said second fork having a fork vertical height, said second fork vertical height fixed generally perpendicular to said first and second rails, wherein said second fork comprises at least one generally perpendicular flange extending towards said first fork;
   a first hydraulic cylinder configured for moving said first carriage from a first position near said first and second rail first ends to a third position near said first and second rail centers;
   a second hydraulic cylinder configured for moving said second carriage from a second position near said first and second rail second ends to a fourth position near said first and second rail centers; and
   a hydraulic control system for controlling the operation of said first and second hydraulic cylinders, said hydraulic control system configured for simultaneously moving the first and second carriages from their first and second respective positions to their third and fourth respective positions and vice versa;

wherein said farm implement attachment portion is pivotally connected to said farm implement arm so that as farm implement lifts said bale lifting device, said bale lifting device can be tilted relative to said farm implement arm so that said forks can be returned to a generally horizontal position.

\* \* \* \* \*